United States Patent [19]
Bocach

[11] Patent Number: 6,115,957
[45] Date of Patent: Sep. 12, 2000

[54] FISHING LURE

[76] Inventor: Joel A. Bocach, 141 Galiano St., Royal Palm Beach, Fla. 33411

[21] Appl. No.: 09/090,572

[22] Filed: Jun. 4, 1998

Related U.S. Application Data

[63] Continuation-in-part of application No. 29/070,214, May 2, 1997, abandoned.

[51] Int. Cl.[7] .................................................. A01K 85/00
[52] U.S. Cl. ...................... 43/42.36; 43/42.27; 43/42.22
[58] Field of Search ................................ 43/42.03, 42.08, 43/42.22, 42.27, 42.36

[56] References Cited

U.S. PATENT DOCUMENTS

| | | | |
|---|---|---|---|
| 2,190,449 | 2/1940 | Goldammer | 43/42.36 X |
| 2,719,377 | 10/1955 | Bennett | 43/42.27 |
| 3,611,615 | 10/1971 | Field | 43/42.36 |
| 4,594,806 | 6/1986 | Brown | 43/42.27 |

*Primary Examiner*—Robert P. Swiatek

[57] ABSTRACT

A fishing lure for attracting fish to a fishing line. The inventive device includes a body member having a front, a back, a top, a bottom, and a pair of sides. A wing member is coupled to the body member with one of the ends of the wing member outwardly extending from one of the sides of the body member and the other end of the wing member outwardly extending from the other side of the body member. The second end of an elongate front flexible member is coupled to the front of the body member while the second end of an elongate rear member is detachably attached to the back of the body member.

11 Claims, 5 Drawing Sheets

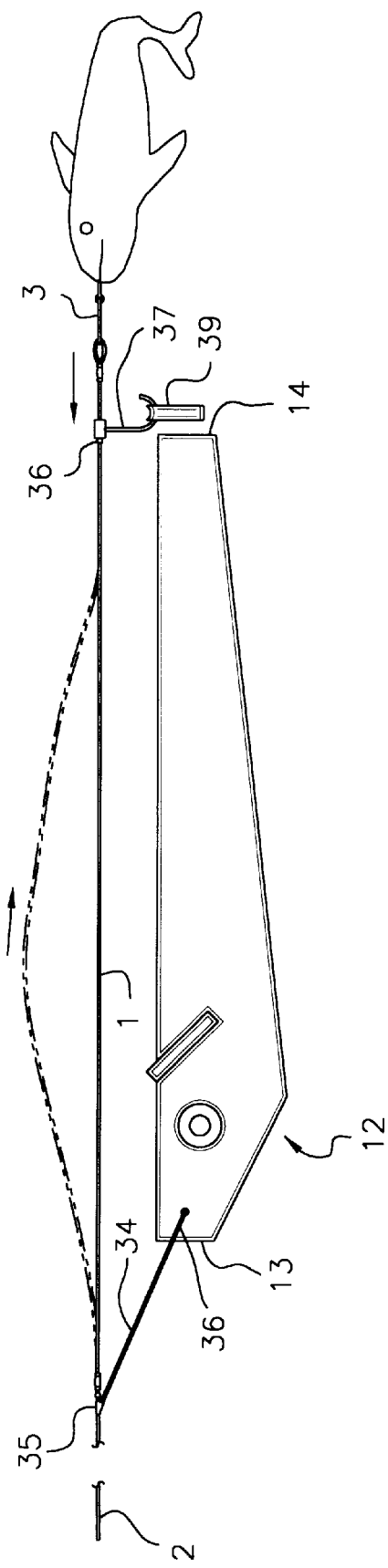

FISHING LURE

CROSS REFERENCE TO RELATED APPLICATION

This application is a continuation-in-part of my prior design patent application Ser. No. 29/070,214, filed May 2, 1997, and now abandoned.

BACKGROUND OF THE INVENTION

1. Field of the Invention

The present invention relates to fishing lures and more particularly pertains to a new fishing lure for attracting fish to a fishing line.

2. Description of the Prior Art

The use of fishing lures is known in the prior art. More specifically, fishing lures heretofore devised and utilized are known to consist basically of familiar, expected and obvious structural configurations, notwithstanding the myriad of designs encompassed by the crowded prior art which have been developed for the fulfillment of countless objectives and requirements.

Known prior art fishing lures include U.S. Pat. No. 5,303,499; U.S. Pat. No. 4,041,636; U.S. Pat. No. Des. 274,081; U.S. Pat. No. 4,854,072; U.S. Pat. No. 5,177,891; and U.S. Pat. No. 4,916,845.

While these devices fulfill their respective, particular objectives and requirements, the aforementioned patents do not disclose a new fishing lure. The inventive device includes a body member having a front, a back, a top, a bottom, and a pair of sides. A wing member is coupled to the body member with one of the ends of the wing member outwardly extending from one of the sides of the body member and the other end of the wing member outwardly extending from the other side of the body member. The second end of an elongate front flexible member is coupled to the front of the body member while the second end of an elongate rear member is detachably attached to the back of the body member.

In these respects, the fishing lure according to the present invention substantially departs from the conventional concepts and designs of the prior art, and in so doing provides an apparatus primarily developed for the purpose of attracting fish to a fishing line.

SUMMARY OF THE INVENTION

In view of the foregoing disadvantages inherent in the known types of fishing lures now present in the prior art, the present invention provides a new fishing lure construction wherein the same can be utilized for attracting fish to a fishing line.

The general purpose of the present invention, which will be described subsequently in greater detail, is to provide a new fishing lure apparatus and method which has many of the advantages of the fishing lures mentioned heretofore and many novel features that result in a new fishing lure which is not anticipated, rendered obvious, suggested, or even implied by any of the prior art fishing lures, either alone or in any combination thereof.

To attain this, the present invention generally comprises a body member having a front, a back, a top, a bottom, and a pair of sides. A wing member is coupled to the body member with one of the ends of the wing member outwardly extending from one of the sides of the body member and the other end of the wing member outwardly extending from the other side of the body member. The second end of an elongate front flexible member is coupled to the front of the body member while the second end of an elongate rear member is detachably attached to the back of the body member.

There has thus been outlined, rather broadly, the more important features of the invention in order that the detailed description hereof that follows may be better understood, and in order that the present contribution of the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, or is it intended to be limiting as to the scope of the invention in any way.

It is therefore an object of the present invention to provide a new fishing lure apparatus and method which has many of the advantages of the fishing lures mentioned heretofore and many novel features that result in a new fishing lure which is not anticipated, rendered obvious, suggested, or even implied by any of the prior art fishing lures, either alone or in any combination thereof.

It is another object of the present invention to provide a new fishing lure which may be easily and efficiently manufactured and marketed.

It is a further object of the present invention to provide a new fishing lure which is of a durable and reliable construction.

An even further object of the present invention is to provide a new fishing lure which is susceptible of a low cost of manufacture with regard to both materials, and labor, and which accordingly is then susceptible of low prices of sale to the consuming public, thereby making such fishing lure economically available to the buying public.

Still yet another object of the present invention is to provide a new fishing lure which provides in the apparatuses and methods of the prior art some of the advantages thereof, while simultaneously overcoming some of the disadvantages normally associated therewith.

Still another object of the present invention is to provide a new fishing lure for attracting fish to a fishing line.

Yet another object of the present invention is to provide a new fishing lure which includes a body member having a front, a back, a top, a bottom, and a pair of sides. A wing member is coupled to the body member with one of the ends of the wing member outwardly extending from one of the sides of the body member and the other end of the wing member outwardly extending from the other side of the body member. The second end of an elongate front flexible member is coupled to the front of the body member while the second end of an elongate rear member is detachable attached to the back of the body member.

Still yet another object of the present invention is to provide a new fishing lure that may be used as an attractor which is positioned in front of the bait on a fishing line to help draw the attention of fish theretowards.

Even still another object of the present invention is to provide a new fishing lure that has a quick release end to help indicate to a user that a fish has been caught on the fishing line.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 8 is a schematic side view of the present invention in use after the free end of the fishing line has been pulled to detach the rear member from the body member.

DESCRIPTION OF THE PREFERRED EMBODIMENT

Figure 1:
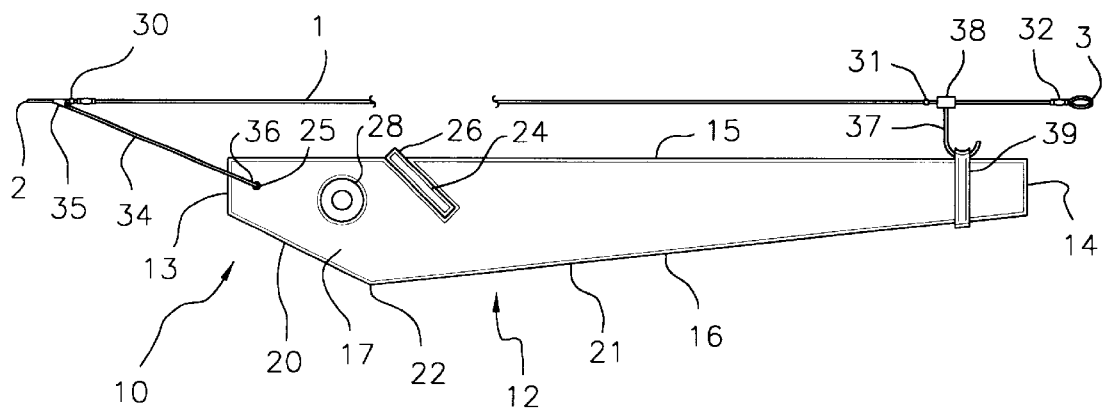
FIG. 1 is a schematic fist side view of a new fishing lure according to the present invention.
Figure 2:
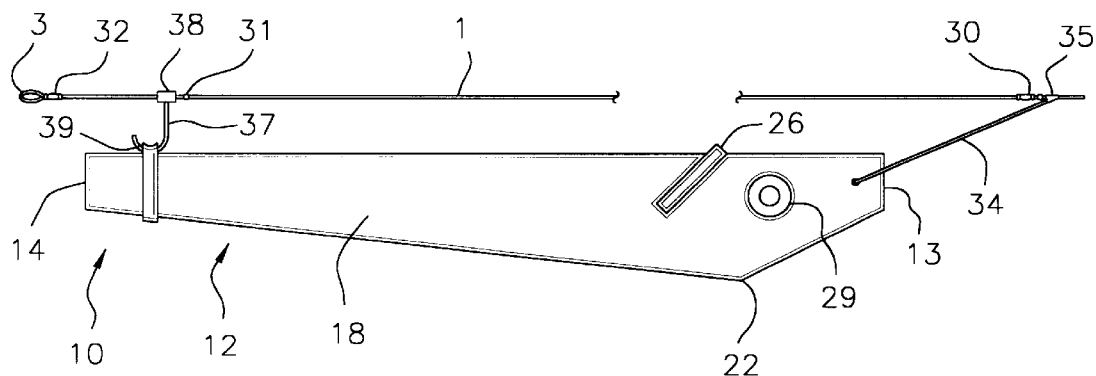
FIG. 2 is a schematic second side view of the present invention.
Figure 3:
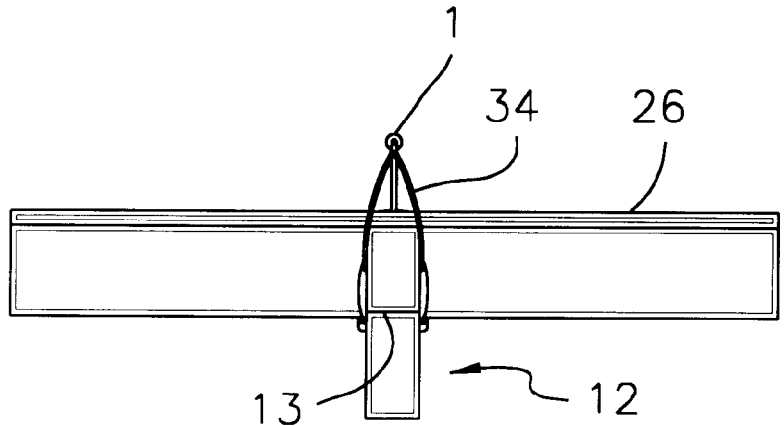
FIG. 3 is a schematic front side view of the present invention.
Figure 4:
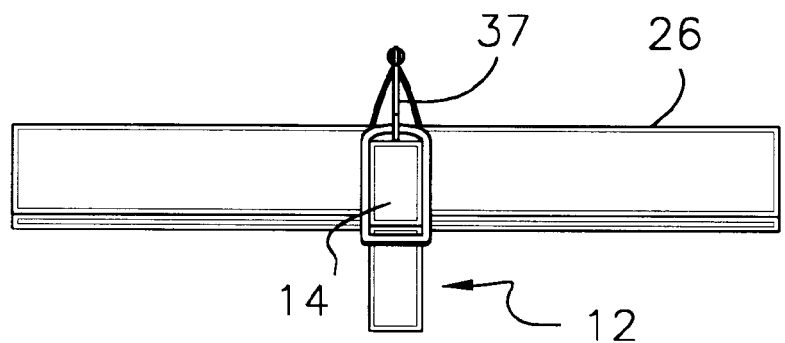
FIG. 4 is a schematic back side view of the present invention.
Figure 5:
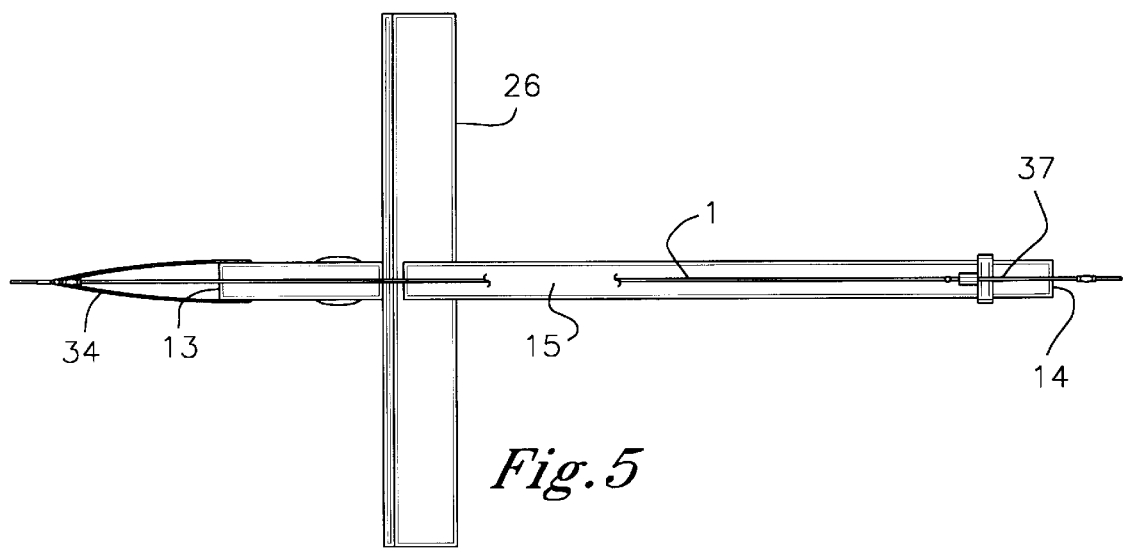
FIG. 5 is a schematic top side view of the present invention.
Figure 6:
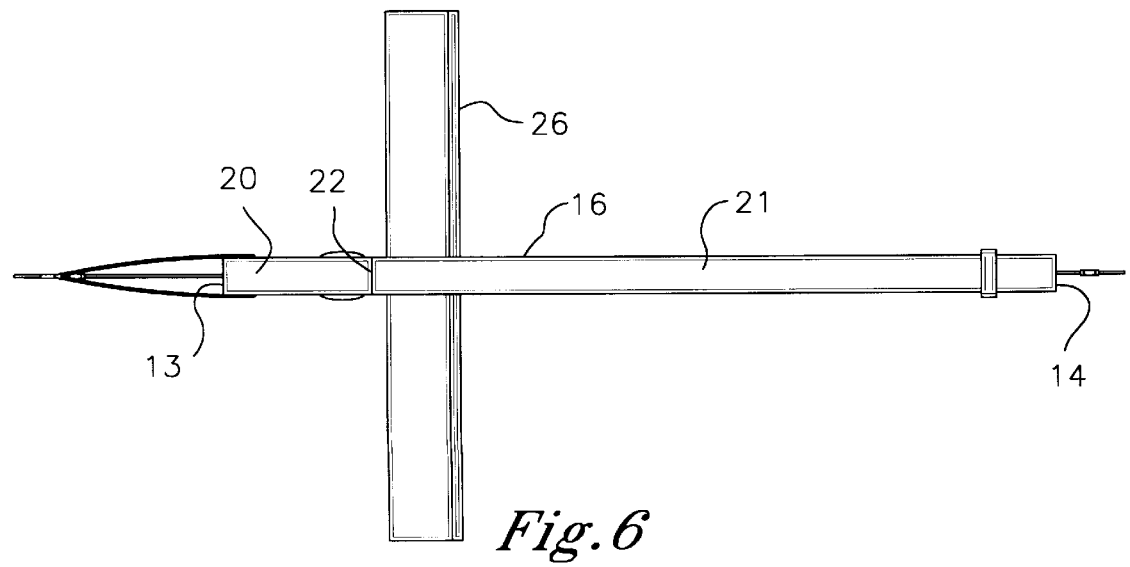
FIG. 6 is a schematic bottom side view of the present invention.

With reference now to the drawings, and in particular to FIGS. 1 through 8 thereof, a new fishing lure embodying the principles and concepts of the present invention and generally designed by the reference numeral 10 will be described.

The fishing lure 10 is designed for use in combination with a fishing line 1 having a fixed end 2 and a free end 3 for attaching a hook and bait thereto. As best illustrated in FIGS. 1 through 8, the fishing lure 10 generally comprises a body member 12 having a front 13, a back 14, a top 15, a bottom 16, and a pair of sides 17,18. A wing member 26 is coupled to the body member 12 with one of the ends of the wing member 26 outwardly extending from one of the sides 17,18 of the body member 12 and the other end of the wing member 26 outwardly extending from the other side of the body member 12. The second end 36 of an elongate front flexible member 34 is coupled to the front 13 of the body member 12 while the second end 39 of an elongate rear member 37 is detachably attached to the back 14 of the body member 12.

In closer detail, the body member 12 has a front 13, a back 14, a top 15, a bottom 16, and a pair of sides 17,18. Preferably, the bottom 16 of the body member 12 has front and back portions 20,21 with the front portion 20 of the bottom 16 located towards the front 13 of the body member 12 and the back portion 21 located towards the back 14 of the body member 12. The front and back portions 20,21 meet at a vertex 22 which extends away from the top 15 of the body member 12. The height of the body member is defined between the top 15 and bottom 16 of the body member 12. Preferably, the height of the body member 12 taken at the vertex 22 is greater than the height taken at a point along the front portion 20 and than the height taken at a point along the back portion 21.

The body member 12 also has a length defined between the front 13 and back 14 of the body member 12 which is preferably less than about 14 inches. Ideally, the length of the front portion 20 of the bottom 16 of the body member 12 is less than about 3 inches, while the length of the back portion 21 of the bottom 16 of the body member 12 is ideally less than about 12 inches. In the preferred embodiment, the body has a thickness taken between the surfaces of the body member 12 of less than about 1 inch.

Optionally, each of the sides 17,18 of the body member 12 has an eye member 28,29 coupled thereto which are formed to resemble an eye. The eye members 28,29 are preferably positioned between the wing member 26 and the front 13 of the body member 12 on their respective side 17,18.

The elongate wing member 26 is preferably generally rectangular and has a pair of opposite ends, and substantially planar front 13 and back 14 surfaces. The length of the wing member 26 extends between the ends of the wing member 26. The wing member 26 is coupled to the body member 12. In the preferred embodiment, the wing member 26 is inserted into a slot 24 in the top 15 of the body member 12. The slot 24 extends through the sides 17,18 of the body member 12. Ideally, the bottom of the slot 24 is extended towards the back portion 21 of the bottom 16 of the body member 12 so that the depth of the slot 24 extends at an oblique angle with respect to the top 15 of the body member 12. The wing member 26 is inserted into the slot 24 such that one of the ends of the wing member 26 outwardly extends from one of the sides of the body member while the other end of the wing member 26 outwardly extends from the other side of the body member. Preferably, the length of the wing member 26 is extended substantially perpendicular to the body member 12.

A first block 30 is fixedly coupled to the fishing line 1. Similarly, a second block 31 is also fixedly coupled to the fishing line 1. The second block 31 is spaced apart from the first block 30 on the fishing line 1 so that the second block 31 is interposed between the first block 30 and the free end 3 of the fishing line 1. Optionally, a third block 32 is coupled to the fishing line 1 between the second block 31 and the free end 3 of the fishing line 1.

An elongate front flexible member 34 has first and second ends 35,36 and a length defined therebetween. The first end 35 of the front flexible member 34 is slidably coupled to the fishing line 1. The first end 35 of the front flexible member 34 is positioned between the fixed end 2 of the fishing line 1 and the first block 30. The second end 36 of the front flexible member 34 is coupled to the front 13 of the body member 12 preferably by looping through the end 36 through a bore 25 extending through the sides 17,18 of the body member 12.

The lure 10 also preferably includes an elongate rear member 37 having first and second ends 38,39 and a length defined therebetween. The first end of the rear member 37 is slidably coupled to the fishing line 1 so that the first end 38 of the rear member 37 is positioned between the second block 31 and the free end 3 of the fishing line 1, ideally between the second and third block 31,32. The second end 39 of the rear member 37 is detachably attached to the back 14 of the body member 12 preferably by looping a flexible band (such as a rubber band) around the body member 12.

A lure length is defined by the sum of the length of the front flexible member 34, the length of the body member 12, and the length of the rear member 37 (i.e.: the length between the first end of the front flexible member 34 and the first end of the rear member 37 when they are fully extended from the body member 12). In use, the length of the fishing line 1 between the first block 30 and the second block 31 is preferably less than the lure length.

Figure 7:
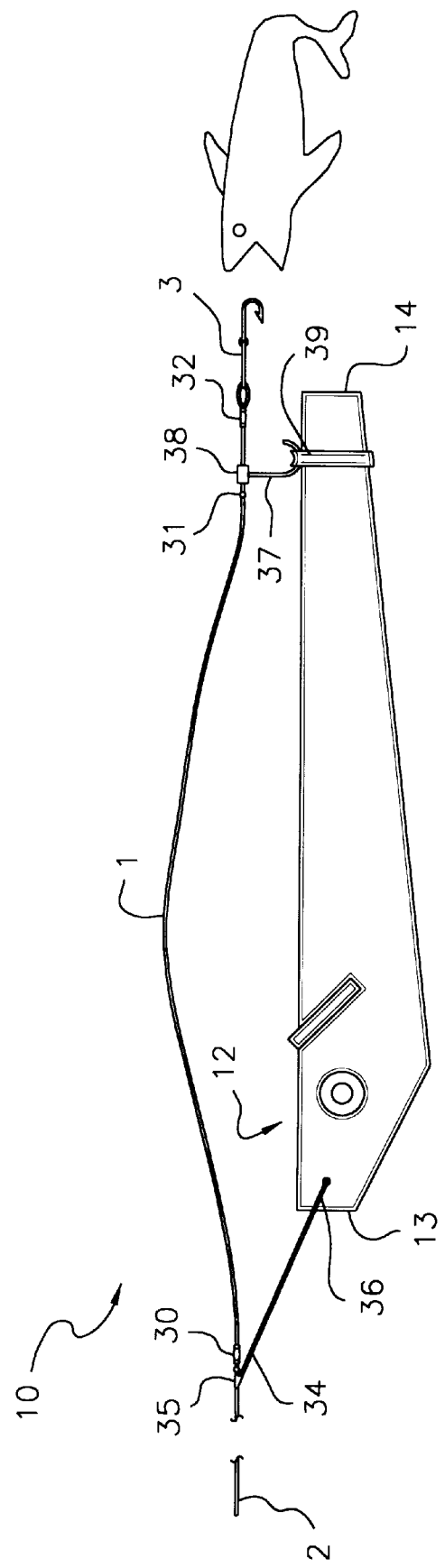
FIG. 7 is a schematic side view of the present invention in use.

In use, as illustrated in FIGS. 7 and 8, the fishing lure is placed in a body of water with the flexible members 34,37 attached to the body member. The first end of the rear member 37 is slidable towards the second block 31 when the free end 3 of the fishing line 1 is pulled (for example, by a fish) away from the fixed end 2 of the fishing line 1 such that further pulling of the free end 3 of the fishing line 1 when the first end of the rear member 37 abuts the second block 31 detaches the second end of the rear member 37 from the back 14 of the body member 12. The back of the body member 12 is now free such that the body member 12 may rise to the surface of the water when the fish is pulling on the free end of the fishing line.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing lure for use in combination with a fishing line having a fixed end and a free end, said fishing lure comprising:

a body member having a front, a back, a top, a bottom, and a pair of sides;

wherein said body member has a length defined between said front and back of said body member;

a wing member having a pair of opposite ends, and front and back surfaces, said wing member having a length being extended between said ends of said wing member, said wing member being coupled to said body member, one of said ends of said wing member being outwardly extended from one of said sides of said body member, another of said ends of said wing member being outwardly extended from another of said sides of said body member;

an elongate front flexible member having first and second ends and a length defined between said first and second ends of said front flexible member, said second end of said front flexible member being coupled to said front of said body member; and an elongate rear member having first and second ends and a length defined between said first and second ends of said rear member, said second end of said rear member being detachably attached to said back of said body member.

2. The fishing lure of claim 1, wherein said bottom of said body member has front and back portions, said front portion of said bottom being located towards said front of said body member, said back portion of said bottom being located towards said back of said body member, said front and back portions meeting at a vertex, said vertex being extended away from said top of said body member.

3. The fishing lure of claim 2, wherein a height is defined between said top and bottom of said body member, wherein the height taken at said vertex is greater than the height taken at a point along said front portion of said bottom of said body member, wherein the height taken at said vertex is greater than the height taken at a point along said back portion of said bottom of said body member.

4. The fishing lure of claim 1, wherein said top of said body member has a slot extending through said sides of said body member, said wing member being inserted into said slot of said top of said body member.

5. The fishing lure of claim 1, wherein said length of said wing member is extended substantially perpendicular to said body member.

6. The fishing lure of claim 1, wherein each of said sides of said body member has an eye member coupled thereto, said eye member being positioned between said wing member and said front of said body member.

7. The fishing lure of claim 1, further comprising a first block being coupled to the fishing line, and a second block being coupled to the fishing line, said second block being spaced apart from said first block, said second block being interposed between the first block and the free end of the fishing line.

8. The fishing lure of claim 7, wherein said first end of said front flexible member is slidably coupled to the fishing line, said first end of said front flexible member being positioned between the fixed end of the fishing line and said first block, wherein said first end of said rear member is slidably coupled to the fishing line, said first end of said rear member being positioned between said second block and the free end of the fishing line.

9. The fishing lure of claim 8, wherein a lure length is defined as the sum of said length of said front flexible member, said length of said body member, and said length of said rear member, and wherein the length of the fishing line between said first block and said second block is less than about said lure length.

10. The fishing lure of claim 8, wherein said first end of said rear member is adapted to slide towards said second block when the free end of the fishing line is pulled away from the fixed end of the fishing line such that further pulling of said free end of said fishing line when said first end of said rear member abuts said second block detaches said second end of said rear member from said back of said body member.

11. A fishing lure for use in combination with a fishing line having a fixed end and a free end, said fishing lure comprising:

a body member having a front, a back, a top, a bottom, and a pair of sides;

said bottom of said body member having front and back portions, said front portion of said bottom being located towards said front of said body member, said back portion of said bottom being located towards said back of said body member, said front and back portions meeting at a vertex, said vertex being extended away from said top of said body member;

wherein a height is defined between said top and bottom of said body member, wherein the height taken at said vertex is greater than the height taken at a point along said front portion of said bottom of said body member, wherein the height taken at said vertex is greater than the height taken at a point along said back portion of said bottom of said body member;

wherein said body member has a length defined between said front and back of said body member;

said top of said body member having a slot extending through said sides of said body member;

a wing member being generally rectangular and having a pair of opposite ends, and front and back surfaces, said wing member having a length being extended between said ends of said wing member, said wing member being inserted into said slot of said top of said body member, said wing member being coupled to said body member, one of said ends of said wing member being outwardly extended from one of said sides of said body member, another of said ends of said wing member being outwardly extended from another of said sides of said body member, said length of said wing member being extended substantially perpendicular to said body member;

each of said sides of said body member having an eye member coupled thereto, said eye member being positioned between said wing member and said front of said body member;

a first block being coupled to the fishing line;

a second block being coupled to the fishing line, said second block being spaced apart from said first block, said second block being interposed between the first block and the free end of the fishing line;

an elongate front flexible member having first and second ends and a length defined between said first and second ends of said front flexible member, said first end of said front flexible member being slidably coupled to the fishing line, said first end of said front flexible member being positioned between the fixed end of the fishing line and said first block, said second end of said front flexible member being coupled to said front of said body member;

an elongate rear member having first and second ends and a length defined between said first and second ends of said rear flexible member, said first end of said rear member being slidably coupled to the fishing line, said first end of said rear member being positioned between said second block and the free end of the fishing line, said second end of said rear member being detachably attached to said back of said body member;

wherein a lure length is defined as the sum of said length of said front flexible member, said length of said body member, and said length of said rear member;

wherein the length of the fishing line between said first block and said second block is less than about said lure length; and wherein said first end of said rear member is slidable towards said second block when the free end of the fishing line is pulled away from the fixed end of the fishing line such that further pulling of said free end of said fishing line when said first end of said rear member abuts said second block detaches said second end of said rear member from said back of said body member.

\* \* \* \* \*